June 20, 1961 K. H. BECK ET AL 2,989,586
FACSIMILE SYSTEMS
Filed July 9, 1956
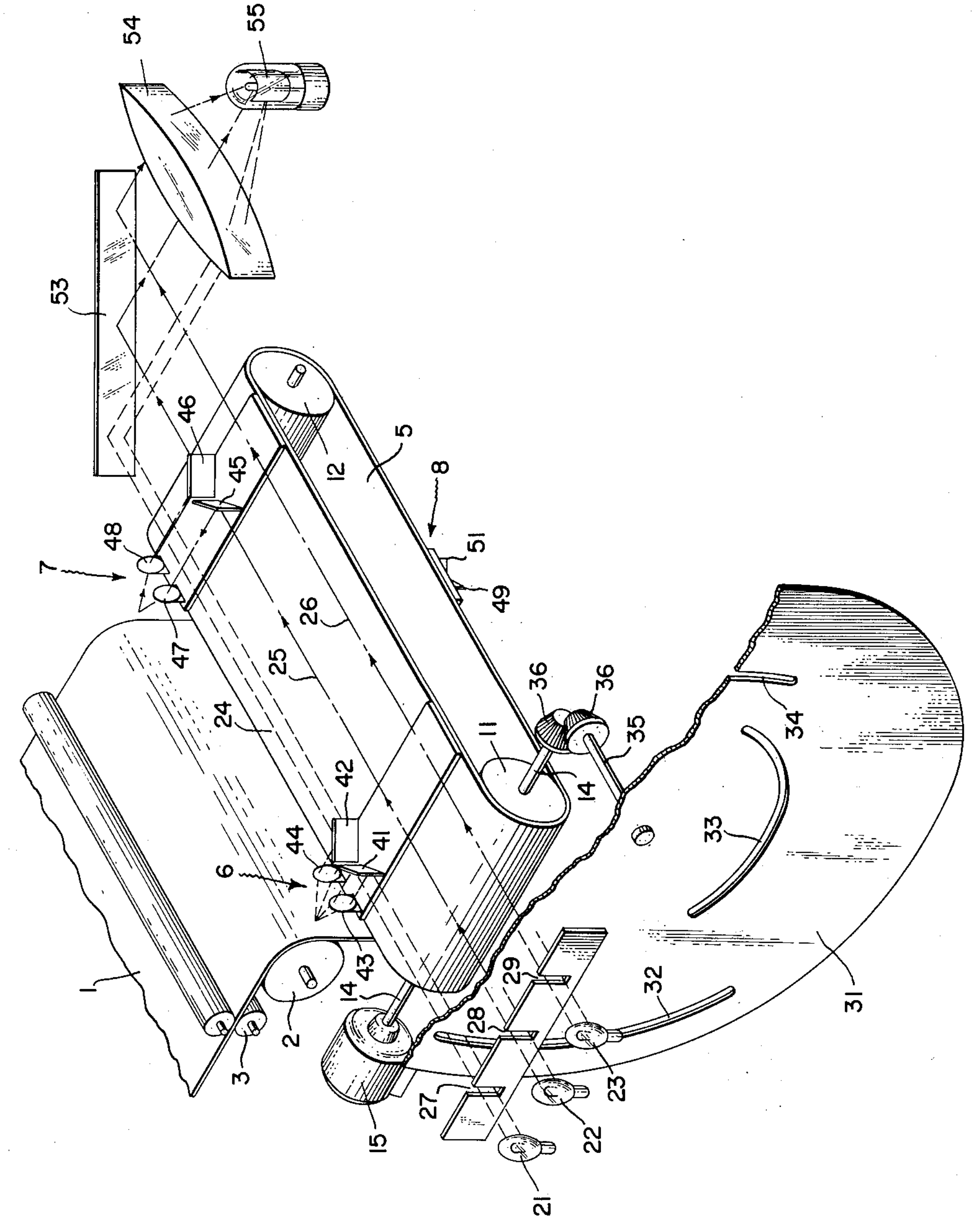
*INVENTORS.*
KENNETH H. BECK
GEORGE C. REIN
*BY* Arthur H. Swanson
ATTORNEY.

United States Patent Office 2,989,586

Patented June 20, 1961

2,989,586
FACSIMILE SYSTEMS

Kenneth H. Beck, Newtown, and George C. Rein, Philadelphia, Pa., assignors to Minneapolis-Honeywell Regulator Company, Minneapolis, Minn., a corporation of Delaware Filed July 9, 1956, Ser. No. 596,505
13 Claims. (Cl. 178—7.1)

A general object of the present invention is to provide a new and improved facsimile scanning system. More specifically, the present invention is concerned with an optical system for scanning copy in a facsimile transmitting apparatus.

In facsimile scanning systems, light is generally reflected from the copy being scanned, concentrated on a photoelectric element in a carrier frequency modulating circuit, and converted into electric currents. The amplitude of the reflected light changes with the changing reflectance of the copy and modulation of the carrier is obtained in accordance with the changing reflectance of the copy. In prior art systems, scanning is usually accomplished either by moving the copy to be scanned relative to the light source and the photoelectric element or moving the light source and the photoelectric element relative to the copy. The former method inherently limits the size of the copy which can be scanned and the latter method generally requires some form of commutation for the electric connections to the light source and the photoelectric element. If continuous scanning is desired, a plurality of light sources and photoelectric elements, arranged to scan in sequence, are usually employed. This introduces the further problem of sequentially switching the output of the photoelectric element to the modulating circuit.

It is a specific object of the present invention to provide a new and improved facsimile scanning system adapted to scan an endless copy and which employs no moving electrical components thereby eliminating the need for commutation and switching.

Another object of the present invention is to provide a facsimile scanning system adapted for continuous scanning yet employing but one photoelectric element.

A further object of the present invention is to provide a new and improved facsimile scanning system in which there is compensation for any lack of collimation in the light sources employed.

The objects of the present invention are achieved in a system employing a continuous belt having a flat portion of travel adjacent to and perpendicular to the copy to be scanned. A plurality of parallel light paths are provided in a plane parallel to the surface of the belt. A plurality of optical scanning heads, one for each light path, are mounted on the surface of the belt at equidistant points at intervals substantially equal to the width of the copy being scanned. Each of these scanning heads includes means to divert and focus light from the associated light paths onto the copy being scanned and means to divert and focus light reflected from the copy back into the associated light path. Suitable focusing means are employed to concentrate light from the light paths onto a single photoelectric element. A shutter, synchronized with the belt driving means, controls the illumination of the light paths in accordance with the scanning sequence.

The various features of novelty which characterize this invention are pointed out with particularity in the claims annexed to and forming a part of this specification. For a better understanding of this invention, its advantages, and specific objects obtained with its use, reference should be had to the accompanying drawing and descriptive matter in which a preferred embodiment of this invention is illustrated and described.

Referring now to the single sheet of drawing, there is shown a perspective view of the scanning system of the present invention. The numeral 1 indicates the copy to be scanned. The copy 1 is shown supported on the rollers 2 and 3. Since the scanning system of the present invention requires no horizontal movement of the copy, it may utilize a scanned copy of any length. In operation, the copy is advanced, by means not shown, the width of one scanning line as the copy is scanned. If it is desired, however, the copy can be advanced at the completion of each scanning excursion. Scanning is accomplished by three optical scanning heads 6, 7, and 8 which are mounted on the endless belt 5. In the view shown, the scanning head 7 is just beginning its scanning excursion and the scanning head 6 has just completed its scanning excursion. The scanning head 8 partially visible on the underside of the belt will be the next head to scan. As shown, the scanning heads 6, 7, and 8 are mounted at equidistant points on the belt 5 at intervals substantially equal to the width of the copy 1.

The endless belt 5 is extended between a pair of rollers 11 and 12. The rollers 11 and 12 support the belt 5 in a plane perpendicular to the surface of the copy 1. The belt 5 has a flat portion of travel where it extends between the rollers 11 and 12. The roller 11 is mounted on an axle 14 which has one end connected to a motor 15 for belt driving purposes.

Three light sources 21, 22, and 23 provide illumination for three parallel light paths 24, 25, and 26. As shown, the light paths 24, 25, and 26 are parallel with each other and with the surface of the belt 5 where it extends between the rollers 11 and 12. Light from the sources 21, 22, and 23 is formed into beams by means of the slits 27, 28, and 29. Further collimation of the light beams may be achieved by providing suitable collimating lenses. A shutter 31 controls the illumination of the light paths 24, 25, and 26 according to the scanning sequence. The shutter 31 comprises a disc having three arc shaped slits 32, 33, and 34. The slits 32, 33, and 34 are 120° arcs positioned at suitable distances from the center of the shutter so as to intersect light paths 24, 25, and 26 respectively. The shutter 31 is mounted on an axle 35 which is connected, for driving purposes, to the axle 14 of the roller 11 by means of the differential gears 36.

Each of the scanning heads comprises a mirror to reflect collimated light from the associated light paths, a lens for focusing that light onto the copy, a second lens to collect light reflected from the copy, and a second mirror which diverts the reflected light back into the associated light path. Accordingly, the scanning means 6 comprises the mirrors 41, 42 and the lenses 43 and 44. The scanning head 7 comprises the mirrors 45 and 46 and the lenses 47 and 48. Similarly, the scanning head 8 comprises mirrors 49 and 51 and two lenses not visible in the view shown. The mirror 42 of the scanning head 6, the mirror 46 of the scanning head 7, and the mirror 51 of the scanning head 8 reflect light along the paths 24, 25, and 26 respectively to a mirror 53 which transmits the light as parallel rays through a lens 54 and finally to a photoelectric element 55 at the focal point of the lens 54. The photoelectric element 55 is connected in the carrier frequency modulating circuit of the facsimile transmitter, this connection not being shown.

The scanning system of the present invention is arranged to provide continuous scanning of the copy. To this end, the scanning heads 6, 7, and 8, are spaced on the belt 5 at distances substantially corresponding to the width of the copy 1. Thus, as the scanning head 6 completes its scanning excursion, the scanning head 8 begins its scanning excursion. Similarly, as the scanning head 6 completes its scanning excursion, the scanning head 7 begins its scanning operation. The shutter 31 is synchronized with the belt motion since it is driven through the differential gears 36 by the motor 14. Thus while information is being sent along the light path 24, the shutter 31 prevents light from traversing the paths 25 and 26. When the scanning head 6 completes its scanning excursion, however, the shutter 31 will have turned until the slit 33 will permit light from the source 23 to traverse the path 26 for scanning by the scanning head 8 and prevent light from the sources 21 and 22 traversing the paths 24 and 25. As shown, the mirrors of the scanning heads 6, 7, and 8 are placed laterally across the belt 5 so that there will be no interference with the light path for the scanning head scanning at any particular time.

By providing optical scanning means, the present invention eliminates the need for having any of the electrical components of the system in motion and thus the need for the commutation of the electrical signals to and from the scanning heads. In addition, it also eliminates the need for switching the electrical signals between the scanning heads and the other electrical components of the system. A further advantage to this type of system is that all switching between the scanning heads is accomplished by means of a relatively non-complex optical shutter.

It should also be noted that the present invention employs but one electrical input for all the scanning heads. This arrangement eliminates variations between scanned lines due to the differences in the characteristics of the photoelectric elements. It also should be noted that the system provides inherent compensation for lack of collimation in the light beams employed for the scanning means. This compensation is achieved from the fact that as the scanning heads get further away from the light sources they are getting nearer the photoelectric element.

While, in accordance with the provisions of the statutes, there has been illustrated and described the best forms of the embodiment of the present invention now known, it will be apparent to those skilled in the art that changes may be made in the forms of the apparatus disclosed without departing from the spirit of the invention as set forth in the appended claims and that in some instances certain features of the invention may be used to advantage without a corresponding use of other features.

Having described this invention, that which is claimed as new and which it is desired to secure by Letters Patent is:

1. In a facsimile scanning system, an endless belt having a flat portion of travel adjacent to the copy to be scanned, a plurality of spaced apart copy scanning means mounted on said belt, each of said copy scanning means being in different lateral positions on said belt to provide continuous scanning of said copy, an individual means for illuminating each of said scanning means, a photosensitive element positioned to receive light from said scanning means, each of said scanning means being operable to reflect light from said illuminating means onto the copy to be scanned and means to reflect light from said copy and means to reflect light reflected thereon from the copy being scanned onto said photosensitive element and driving means for said belt and a shutter synchronized with said belt to cause the illumination at any given time of only the scanning means adjacent the copy being scanned.

2. In a scanning system, an endless belt mounted between two pulleys and having a flat portion of travel adjacent to the copy being scanned, a plurality of parallel light paths parallel to said pulleys and perpendicular with the copy being scanned, each of said paths being laterally displaced with respect to one another above the flat portion of the belt, a photosensitive element, reflecting means positioned to reflect light from each of said plurality of paths onto said photosensitive element, a scanning means for each of said light paths, each of said scanning means being mounted on said belt in a laterally displaced spaced apart manner with one another and in line with one of the said light paths and positioned along the belt with respect to the copy being scanned so as to provide continuous scanning of said copy, each of said scanning means comprising means to divert light from said path onto said copy and to divert light reflected from said copy back into said light path, belt driving means and a shutter synchronized with the motion of the belt for causing the illumination of said light paths in sequence.

3. In a facsimile scanning system, a plurality of parallel light paths in a plane perpendicular to the line of copy being scanned, an endless belt having a flat portion of travel adjacent to and parallel with said light paths, a plurality of scanning means each mounted in different laterally displaced positions along said belt at equidistant points having intervals substantially equal to the width of the copy scanning distance, one in each of said light paths, each of said scanning means comprising means to divert and focus light from said path onto the copy being scanned and to divert and focus light reflected from said copy back into said light path, means for driving said belt to cause said scanning means to scan the copy in sequence, means synchronized with said driving means for illuminating said light paths in accordance with said scanning sequence, and means for focusing light from each of said paths onto a photosensitive element.

4. In a facsimile scanning system, a plurality of parallel light paths in a plane perpendicular to the line of copy being scanned, an endless belt having a flat portion of travel adjacent to and parallel with said light paths, driving means for said belt, a plurality of scanning means, one for each of said light paths, each of said scanning means being mounted in different laterally displaced positions along said belt at equidistant points that are at intervals substantially equal to the width of the copy scanning distance, each of said scanning means comprising means to divert light from its associated light path onto the copy being scanned and means to divert light reflected from said copy back into its associated light path, means for providing illumination of said light paths in sequence one after the other as the scanning means associated with the particular path is adjacent the copy to be scanned, and means focusing the light in said paths onto a photosensitive element.

5. In a facsimile scanning system, a plurality of light paths parallel with each other in a plane perpendicular to the line of copy being scanned, comprising a scanning means for each of said light paths each laterally displaced from one another in said plane that is perpendicular to the said line of copy being scanned, means to divert light from its associated light path onto the copy being scanned and means to divert light reflected from said copy back into said light path, means for driving said scanning means in a continuous sequence along said light paths to provide continuous scanning of said copy, means for providing for the illumination of said light paths in accordance with said continuous scanning sequence, and means for focusing light in said light paths onto a photoelectric element.

6. In a facsimile scanning system, a plurality of light paths parallel with each other in a plane perpendicular to the line of copy being scanned, a plurality of scanning means, one for each of said light paths, each of said scanning means comprising means to divert light from its associated light path onto the copy being scanned and means to divert light reflected from said copy back into said light path, an endless belt, driving means for said belt, each of said scanning means being mounted at spaced apart intervals along said belt in different laterally displaced positions to provide continuous scanning of said copy, means for illuminating said light paths at a time in a sequence in accordance with said continuous scanning, and means for focusing by light in said paths onto a photosensitive element.

7. In a facsimile scanning system, an endless belt having a flat portion of travel adjacent to the copy being scanned, a plurality of copy scanning means each being mounted on said belt in different laterally displaced positions thereon, a light source for each of said means, each of said copy scanning means comprising first reflecting means positioned to reflect light for the source associated therewith onto the copy to be scanned and second reflecting means to reflect the light reflected thereon by the copy to a common photosensitive element positioned to receive said light, driving means for said belt, and a shutter synchronized with said belt to permit but one scanning means to receive light from the light source associated therewith at a given time.

8. In a facsimile scanning system, a plurality of parallel light paths in a plane perpendicular to the line of copy being scanned, a plurality of optical scanning heads, one for each of said light paths, driving means for said scanning heads, each of said scanning heads being mounted on said driving means at equidistant points and at different laterally displaced positions thereon, each of said scanning heads comprising means to reflect light from its associated light path onto the copy to be scanned and means to reflect light reflected from said copy back into its light path, a shutter synchronized with said driving means to prevent the illumination of all of the light paths except the path associated with the scanning head scanning the copy at a particular time, and means to focus light from all of said paths onto a single photoelectric element.

9. In a facsimile scanning system, a plurality of parallel light paths arranged to be illuminated according to a predetermined scanning sequence, said light paths being in a plane perpendicular to the line of copy being scanned, a plurality of optical scanning heads, one for each of said light paths, driving means for said scanning heads, each of said scanning heads being mounted at spaced apart intervals along said driving means in different laterally displaced positions in accordance with said predetermined scanning sequence, each of said scanning heads comprising means to reflect light from its associated light paths onto the copy to be scanned and means to reflect light from said copy back into its light path, a shutter synchronized with said driving means to cause the illumination of said light paths in said predetermined scanning sequence, and means to focus light from all of said light paths onto a single photoelectric element.

10. In a facsimile scanning system, a plurality of spaced apart light paths parallel to each other in a plane perpendicular to the line of copy being scanned, an optical scanning head for each of said light paths, each of said optical scanning heads comprising a mirror to divert light from its associated light path, a lens to focus said diverted light onto the copy being scanned, a lens to collect light reflected from said copy and a mirror to reflect said collected light back into the associated light path, an endless belt, each of the mirrors of said optical scanning heads being mounted on said endless belt in different laterally displaced portions thereon which are at equidistant points at intervals substantially equal to the width of the copy being scanned, means for illuminating said light paths in accordance with said continuous scanning sequence, and means for focusing light in said light paths onto a single photoelectric element.

11. In a facsimile scanning system, an endless belt having a flat portion of travel adjacent to a horizontal flat portion of an intermittently moving copy to be scanned, a plurality of copy scanning means mounted on said belt in longitudinal spaced apart positions which are laterally displaced from one another to provide continuous scanning of said copy, a plurality of light sources to provide a separate light path to illuminate each of said scanning means, a fixedly positioned photosensitive element positioned to receive light from each of said scanning means, each of said scanning means comprising means to reflect light from its associated illuminating means onto the copy to be scanned and a means to reflect light reflected thereon from the copy being scanned onto said photosensitive element, driving means for said belt and a shutter synchronized with travel of said belt to sequentially cause said light paths to illuminate at any given time the scanning means that is adjacent the copy being scanned.

12. In a scanning system, an endless belt mounted between two pulleys and having a flat portion of travel adjacent to a horizontal flat portion of an intermittently moving copy being scanned, a plurality of parallel light paths parallel to said pulleys and perpendicular with the copy being scanned, a photosensitive element, reflecting means positioned to reflect light from said plurality of paths onto said photosensitive element, a scanning means for each of said light paths, each of said scanning means being mounted along said belt in different laterally displaced spaced apart positions in the associated light path and positioned along the belt with respect to the said flat portion of said copy being scanned so as to provide continuous scanning of said moving copy, each of said scanning means comprising means to divert light from said path onto said copy and to divert light reflected from said copy back into said light path, belt driving means and a shutter synchronized with the motion of the belt for causing the illumination of said light paths in sequence.

13. In a facsimile scanning system, an endless belt having a flat portion of travel adjacent to a horizontal flat portion of an intermittently moving copy being scanned, a plurality of copy scanning means mounted along said belt in different laterally displaced spaced apart portions, a light source for each of said scanning means, each of said copy scanning means comprising first reflecting means positioned to reflect light for the source associated therewith onto the copy to be scanned and second reflecting means to reflect the light reflected thereon by the copy to a common photosensitive element positioned to receive said light, driving means for said belt, and a shutter synchronized with said belt to permit but one scanning means to receive light from the light source associated therewith at a given time.

References Cited in the file of this patent

UNITED STATES PATENTS

| | | |
|---|---|---|
| 1,740,490 | Wright | Dec. 24, 1929 |
| 2,227,011 | Schlesinger | Dec. 31, 1940 |
| 2,245,286 | Marzocchi | June 10, 1941 |
| 2,487,555 | Yule | Aug. 9, 1949 |
| 2,792,448 | Deuth et al. | May 14, 1957 |